(12) United States Patent
Hunt et al.

(10) Patent No.: US 6,957,133 B1
(45) Date of Patent: Oct. 18, 2005

(54) SMALL-SCALE, INTEGRATED VEHICLE TELEMATICS DEVICE

(75) Inventors: Robert Hunt, Vista, CA (US); Larkin Lowrey, Seabrook, TX (US); Matthew Banet, Del Mar, CA (US)

(73) Assignee: Reynolds & Reynolds Holdings, Inc., Dayton, OH (US)

( * ) Notice: Subject to any disclaimer, the term of this patent is extended or adjusted under 35 U.S.C. 154(b) by 0 days.

(21) Appl. No.: 10/431,947

(22) Filed: May 8, 2003

(51) Int. Cl.[7] .................................. G06F 7/00
(52) U.S. Cl. .......................... 701/29; 701/36
(58) Field of Search .................. 701/29–33, 36

(56) References Cited

U.S. PATENT DOCUMENTS

| | | |
|---|---|---|
| 3,748,894 A | 7/1973 | White et al. |
| 4,258,421 A | 3/1981 | Juhasz et al. |
| 4,602,127 A | 7/1986 | Neely et al. |
| 4,690,475 A | 9/1987 | McElroy |
| 4,694,408 A | 9/1987 | Zaleski |
| 4,926,330 A | 5/1990 | Abe et al. |
| 4,956,777 A | 9/1990 | Cearley et al. |
| 5,003,317 A | 3/1991 | Gray et al. |
| 5,026,293 A | 6/1991 | Wilson |
| 5,050,080 A | 9/1991 | Abe |
| 5,157,610 A | 10/1992 | Asano et al. |
| 5,223,844 A | 6/1993 | Mansell et al. |
| 5,289,378 A | 2/1994 | Miller et al. |
| 5,343,906 A | 9/1994 | Tibbals, III |
| 5,442,553 A | 8/1995 | Parrillo |
| 5,450,321 A | 9/1995 | Crane |
| 5,463,567 A | 10/1995 | Boen et al. |
| 5,473,540 A | 12/1995 | Schmitz |
| 5,479,479 A | 12/1995 | Braitberg et al. |
| 5,491,486 A | 2/1996 | Welles et al. |
| 5,532,927 A | 7/1996 | Pink et al. |
| 5,537,336 A | 7/1996 | Joyce |
| 5,550,551 A | 8/1996 | Alesio |
| 5,574,427 A | 11/1996 | Cavallaro |
| 5,671,141 A | 9/1997 | Smith et al. |
| 5,673,305 A | 9/1997 | Ross |

(Continued)

FOREIGN PATENT DOCUMENTS

| | | |
|---|---|---|
| CA | 2133673 | 10/1994 |
| EP | 0816820 A2 | 1/1998 |
| WO | WO 00/40038 | 7/2000 |
| WO | WO 00/79727 | 12/2000 |

OTHER PUBLICATIONS

U.S. Appl. No. 09/776,033, filed Feb. 1, 2001, Banet et al.
U.S. Appl. No. 09/808,690, filed Mar. 14, 2001, Lowrey et al.
U.S. Appl. No. 09/922,954, filed Aug. 6, 2001, Lowrey et al.
U.S. Appl. No. 10/810,373, filed Mar. 26, 2004, Lowrey et al.
U.S. Appl. No. 10/823,478, filed Apr. 13, 2004, Williams et al.

(Continued)

*Primary Examiner*—Yonel Beaulieu
(74) *Attorney, Agent, or Firm*—Stephen C. Glazier; Kirkpatrick & Lockhart; Nicholson Graham

(57) ABSTRACT

Embodiments of the present invention relate to a wireless appliance for monitoring a vehicle. In an embodiment, the appliance includes: (1) a microprocessor; (2) a vehicle-communication circuit; (3) a GPS module; and (4) a wireless transmitter. The wireless transmitter receives and transmits location-based data generated by the GPS module and diagnostic data collected by the vehicle-communication circuit. The vehicle-communication circuit is integrated into a single ASIC that includes modules for managing different vehicle-communication protocols, such as, for example, J1850 PWM, J1850 VPWM, ISO 9141-2, CAN, Keyword 2000, and J170S.

79 Claims, 8 Drawing Sheets

U.S. PATENT DOCUMENTS

| | | | |
|---|---|---|---|
| 5,680,328 | A | 10/1997 | Skorupski et al. |
| 5,732,074 | A | 3/1998 | Spaur et al. |
| 5,737,215 | A | 4/1998 | Schricker et al. |
| 5,754,965 | A | 5/1998 | Hagenbuch |
| 5,758,300 | A | 5/1998 | Abe |
| 5,781,871 | A | 7/1998 | Mezger et al. |
| 5,797,134 | A | 8/1998 | McMillan et al. |
| 5,798,647 | A | 8/1998 | Martin et al. |
| 5,808,907 | A | 9/1998 | Shetty et al. |
| 5,850,209 | A | 12/1998 | Lemke et al. |
| 5,884,202 | A | 3/1999 | Arjomand |
| 5,928,292 | A | 7/1999 | Miller et al. |
| 5,941,918 | A | 8/1999 | Blosser |
| 6,064,970 | A | 5/2000 | McMillan et al. |
| 6,104,988 | A | 8/2000 | Klarer |
| 6,141,611 | A | 10/2000 | Mackey et al. |
| 6,154,658 | A | 11/2000 | Caci |
| 6,167,426 | A | 12/2000 | Payne et al. |
| 6,240,295 | B1 | 5/2001 | Kennedy et al. |
| 6,263,268 | B1 | 7/2001 | Nathanson |
| 6,285,953 | B1 | 9/2001 | Harrison et al. |
| 6,295,492 | B1 | 9/2001 | Lang et al. |
| 6,338,152 | B1 | 1/2002 | Fera et al. |
| 6,339,745 | B1 | 1/2002 | Novik |
| 6,356,205 | B1 | 3/2002 | Salvo et al. |
| 6,356,823 | B1 | 3/2002 | Iannotti et al. |
| 6,400,701 | B2 | 6/2002 | Lin et al. |
| 6,408,232 | B1 * | 6/2002 | Cannon et al. ............... 701/29 |
| 6,429,773 | B1 | 8/2002 | Schuyler |
| 6,442,460 | B1 | 8/2002 | Larson et al. |
| 6,459,988 | B1 | 10/2002 | Fan et al. |
| 6,487,494 | B2 | 11/2002 | Odinak et al. |
| 6,487,717 | B1 | 11/2002 | Brunemann et al. |
| 6,496,777 | B2 | 12/2002 | Tennison et al. |
| 6,502,030 | B2 | 12/2002 | Hilleary |
| 6,505,106 | B1 | 1/2003 | Lawrence et al. |
| 6,507,786 | B2 | 1/2003 | Flick |
| 6,522,267 | B2 | 2/2003 | Flick |
| 6,526,335 | B1 | 2/2003 | Treyz et al. |
| 6,526,460 | B1 | 2/2003 | Dauner et al. |
| 6,529,159 | B1 | 3/2003 | Fan et al. |
| 6,552,682 | B1 | 4/2003 | Fan et al. |
| 6,556,889 | B2 | 4/2003 | Rudick et al. |
| 6,556,905 | B1 | 4/2003 | Mittelsteadt et al. |
| 6,564,127 | B1 | 5/2003 | Bauerle et al. |
| 6,580,916 | B1 | 6/2003 | Weisshaar et al. |
| 6,594,579 | B1 | 7/2003 | Lowrey et al. |
| 6,604,032 | B1 | 8/2003 | Moller |
| 6,604,033 | B1 | 8/2003 | Banet et al. |
| 6,604,038 | B1 | 8/2003 | Lesesky et al. |
| 6,609,051 | B2 | 8/2003 | Fiechter et al. |
| 6,611,686 | B1 | 8/2003 | Smith et al. |
| 6,611,739 | B1 | 8/2003 | Harvey et al. |
| 6,611,740 | B2 | 8/2003 | Lowrey et al. |
| 6,611,755 | B1 | 8/2003 | Coffee et al. |
| 6,636,790 | B1 | 10/2003 | Lightner et al. |
| 6,675,081 | B2 | 1/2004 | Shuman et al. |
| 6,687,587 | B2 | 2/2004 | Kacel |
| 6,694,234 | B2 | 2/2004 | Lockwood et al. |
| 6,718,425 | B1 | 4/2004 | Pajakowski et al. |
| 6,732,031 | B1 | 5/2004 | Lightner et al. |
| 6,732,032 | B1 | 5/2004 | Banet et al. |
| 6,754,485 | B1 | 6/2004 | Obradovich et al. |
| 2001/0016789 | A1 | 8/2001 | Staiger |
| 2001/0033225 | A1 | 10/2001 | Razavi et al. |
| 2002/0008644 | A1 | 1/2002 | Flick |
| 2002/0008645 | A1 | 1/2002 | Flick et al. |
| 2002/0016655 | A1 | 2/2002 | Joao |
| 2002/0029101 | A1 | 3/2002 | Larson et al. |
| 2002/0032505 | A1 | 3/2002 | Good |
| 2002/0078458 | A1 | 6/2002 | Furon et al. |
| 2002/0133273 | A1 | 9/2002 | Lowrey et al. |
| 2002/0140545 | A1 | 10/2002 | Nietupski et al. |
| 2002/0143446 | A1 | 10/2002 | Rogers et al. |
| 2002/0150050 | A1 | 10/2002 | Nathanson |
| 2002/0173889 | A1 | 11/2002 | Odinak et al. |
| 2002/0177476 | A1 | 11/2002 | Chou |
| 2003/0004624 | A1 | 1/2003 | Wilson et al. |
| 2003/0009270 | A1 | 1/2003 | Breed |
| 2003/0078722 | A1 | 4/2003 | Odinak et al. |
| 2003/0093204 | A1 | 5/2003 | Adachi et al. |
| 2003/0130005 | A1 | 7/2003 | Weisshaar et al. |
| 2003/0139179 | A1 | 7/2003 | Fuchs et al. |
| 2003/0147534 | A1 | 8/2003 | Ablay et al. |
| 2003/0231118 | A1 | 12/2003 | Kitson |
| 2003/0236596 | A1 | 12/2003 | Eisenmann et al. |
| 2004/0023645 | A1 | 2/2004 | Olsen et al. |
| 2004/0039502 | A1 | 2/2004 | Wilson et al. |
| 2004/0044454 | A1 | 3/2004 | Ross et al. |
| 2004/0104842 | A1 | 6/2004 | Drury et al. |
| 2004/0196182 | A1 | 10/2004 | Unnold |

OTHER PUBLICATIONS

U.S. Appl. No. 10/831,952, filed Apr. 26, 2004, Hunt et al.

U.S. Appl. No. 10/841,724, filed May 7, 2004, Lightner et al.

U.S. Appl. No. 09/776,083, filed Feb. 1, 2001, Banet et al.

U.S. Appl. No. 09/776,106, filed Feb. 1, 2001, Lightner et al.

U.S. Appl. No. 09/804,888, filed Mar. 13, 2001, Lowrey et al.

U.S. Appl. No. 09/908,440, filed Jul. 18, 2001, Lightner et al.

U.S. Appl. No. 10/301,010, filed Nov. 21, 2002, Lightner et al.

U.S. Appl. No. 10/447,713, filed May 29, 2003, Lightner et al.

U.S. Appl. No. 10/456,246, filed Jun. 6, 2003, Lowrey et al.

U.S. Appl. No. 10/456,788, filed Jun. 6, 2003, Banet et al.

U.S. Appl. No. 10/614,665, filed Jul. 7, 2003, Lowrey et al.

U.S. Appl. No. 10/615,516, filed Jul. 8, 2003, Lightner et al.

U.S. Appl. No. 10/625,942, filed Jul. 24, 2003, Banet et al.

U.S. Appl. No. 10/626,779, filed Jul. 24, 2003, Lightner et al.

U.S. Appl. No. 10/626,810, filed Jul. 24, 2003, Lowrey et al.

U.S. Appl. No. 10/632,033, filed Jul. 31, 2003, Banet et al.

RD–422061 A; Anonymous; Jun. 10,1999; Abstract, "Using Internet for vehicle diagnostics–enabling using to operate vehicle personal computer to direct web browser to vehicle diagnostics website".

Bary W. Wilson et al., "Modular system for multiparameter in–line machine fluid analysis" (Technology showcase Apr. 3–6, 2000).

Motorola, Inc., "Automotive ISO 9141 Serial Link Driver," 1996, pp. 1–12.

D. John Oliver, Intel Corporation, "Implementing the J1850 Protocol" no date.

* cited by examiner

| | ObdBuf | |
|---|---|---|
| SUPPIDS | 0xbf0f6980 | PIDs supported |
| EVLSUP | rcfmcCFM EODasehC eODasehC | Eval supported/status |
| MIL | on | MIL light |
| NUMDTC | 1 | No. of DTCs |
| FUEL1 | closed | Fuel system status |
| LOAD | 10.2 % | Calculated load value |
| ECT | 188 degF | Engine coolant temp |
| SRFT1 | 5.5 % | Short term fuel trim bank 1 |
| LNGF1 | 0.8 % | Long term fuel trim bank 1 |
| RPM | 652 RPM | Engine speed |
| VSS | 24 MPH | Vehicle speed |
| SPARK | 9 deg | Ignition timing (ATDC) |
| IAT | 100 degF | Intake air temp |
| MAF | 5.82 gm/s | Air flow rate |
| TP | 25.5 % | Throttle position |
| O2SLO | B1S1 B1S2 B2S1 B2S2 | O2 sensor location |
| O2S11 | 0.0 % | O2 bank 1 sensor 1 |
| O2S11V | 0.055 V | O2 bank 1 sensor 1 |
| O2S12 | 100.0 % | O2 bank 1 sensor 2 |
| O2S12V | 0.100 V | O2 bank 1 sensor 2 |
| O2S21 | 3.1 % | O2 bank 2 sensor 1 |
| O2S21V | 0.070 V | O2 bank 2 sensor 1 |
| O2S22 | 100.0 % | O2 bank 2 sensor 2 |
| O2S22V | 0.040 V | O2 bank 2 sensor 2 |
| ODO | 8175 mi | Odometer |
| AIR | 15541792 gm | Total air mass |
| LRPM | 1711390 K/rpm | Total load*RPM |
| BATV | 14.0 V | Battery (on) |
| BATVOFF | 13.4 V | Battery (off) |
| RESETS | 17 | Resets |
| MANUF | 0xO2100000 | Manuf codes |
| TRIPS | 738 | Trips |
| KEYON | 2m 50s -> 178 sec | Keyon time |
| RUN | 12d 5h 5m 55s -> 1055155 sec | Run time |
| DTC_C | P0743 | OBD DTCs |
| SCHEMA | 0x3b901763 Generic-v2032 | Schema |
| MPAK_BASE | 22 | Mobitex base station base ID |
| MPAK_AREA | 39 | Mobitex base station area ID |
| MPAK_RSSI | -79 dBuV | Received signal strength indicator |

Fig. 3

SMALL-SCALE, INTEGRATED VEHICLE TELEMATICS DEVICE

BACKGROUND

1. Field

Embodiments of the present invention relate generally to vehicle telematics. More specifically, embodiments relate to wireless, internet-based systems that collect, transmit, and analyze diagnostic and location-based data from a motor vehicle.

2. Description of Related Art

Some vehicles include global positioning systems ('GPSs'). A conventional GPS features an antenna that receives signals from orbiting satellites and a chipset that processes these signals to calculate a GPS 'fix'. The fix features data such as a vehicle's latitude, longitude, altitude, heading, and velocity. The fix describes the vehicle's location with a typical accuracy of about 10 meters or better.

Light-duty automobiles and trucks beginning with model year 1996 include on-board diagnostic (OBD-II) systems as mandated by the Environmental Protection Agency (EPA). OBD-II systems monitor the vehicle's electrical, mechanical, and emissions systems and generate data that are processed by a vehicle's engine control unit (ECU) to detect malfunctions or deterioration in the vehicle's performance. The data typically include parameters such as vehicle speed (VSS), engine speed (RPM), engine load (LOAD), and mass air flow (MAF). The ECU can also generate diagnostic trouble codes (DTCs), which are 5-digit codes (e.g., 'P0001') indicating electrical/mechanical problems with the vehicle. Most vehicles manufactured after 1996 include a standardized, serial 16-cavity connector, referred to herein as an 'OBD-II connector', that makes these data available. The OBD-II connector serially communicates with the vehicle's ECU and typically lies underneath the vehicle's dashboard.

Conventional GPSs can be combined with systems for collecting the vehicle's OBD-II diagnostic data to form 'telematics' systems. Such telematics systems typically include (1) a microprocessor that runs firmware that controls separate circuits that communicate with different vehicle makes (e.g., Ford, GM, Toyota) to collect OBD-II data; (2) a GPS module; and (3) a separate wireless transmitter module that transmits the GPS and OBD-II data.

BRIEF DESCRIPTION OF THE DRAWINGS

FIG. 3 is a screen capture of a web page that displays a vehicle's diagnostic data monitored by the wireless appliance of FIG. 1B according to an embodiment of the present invention.

DETAILED DESCRIPTION

Figure 1A:
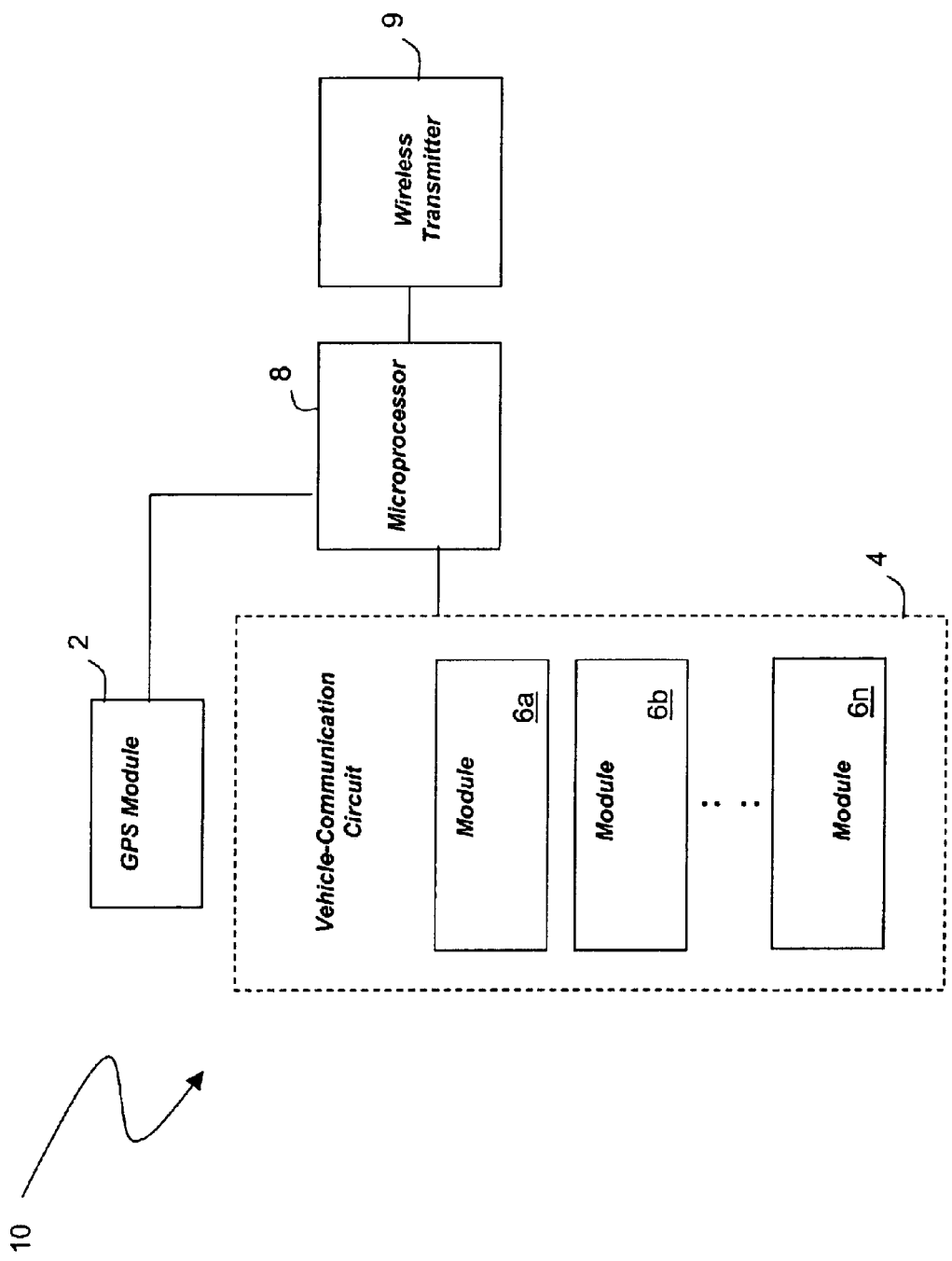
FIG. 1A is a schematic drawing of a wireless appliance according to an embodiment of the present invention.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

Embodiments of the present invention provide a small-scale, wireless, internet-based system for monitoring and analyzing a vehicle's GPS and diagnostic data. Specifically, embodiments provide a system that supports the above-mentioned functions using a wireless appliance based on an integrated, silicon-based architecture. The architecture features an application-specific integrated circuit ('ASIC') for communicating with multiple types of OBD-II systems. It also includes a GPS system and wireless transmitter that use antennae that are integrated into the wireless appliance. This results in a small, compact device that can be easily installed in a vehicle in a matter of minutes.

The wireless appliance monitors location and diagnostic data to provide services such as roadside assistance to a disabled vehicle or recovery of a stolen vehicle. In a related implementation, the appliance provides a GPS-based system for alerting a vehicle's owner that someone other than the owner has moved the vehicle (e.g., the vehicle is stolen or towed).

More specifically, in one aspect, the invention provides a wireless appliance for monitoring a vehicle that includes: (1) a microprocessor, (2) a vehicle-communication circuit; (3) a GPS module; and (4) a wireless transmitter. The wireless transmitter receives and transmits location-based data generated by the GPS module and diagnostic data collected by the vehicle-communication circuit. The vehicle-communication circuit is integrated into a single ASIC that includes modules for managing different vehicle-communication protocols, e.g. J1850 PWM (a protocol for Ford Vehicle), J1850 VPWM (General Motors), ISO 9141-2 (Toyota and other Japanese makes), CAN (e.g. ISO-15765; a next-generation protocol), Keyword 2000 (Hyundai, Mercedes), and J1708 (for medium and heavy-duty trucks, such as trucks made by Volvo, Kenworth, CAT, Hino). Each protocol is described in more detail below.

In one embodiment, the wireless appliance includes a multiplexing circuit that provides electrical communication between the microprocessor and one of the modules. The multiplexing circuit, for example, can switch electrical communication from one module to another. In other embodiments, the vehicle-communication circuit includes a microcontroller that connects to the microprocessor using an asynchronous serial connection.

The microprocessor may run firmware that determines the vehicle-communication protocol of a host vehicle. Once this is determined, the microprocessor selects the appropriate module in the vehicle-communication circuit that supports the vehicle-communication protocol.

In other embodiments, the wireless appliance includes a GPS antenna in electrical contact with the GPS module; a radio antenna in electrical contact with the wireless transmitter; and a single housing that houses the GPS antenna, the radio antenna, and all the other components in the wireless appliance.

The wireless appliance can also include an internal battery. In this embodiment, the appliance receives power from the vehicle's standard 12-volt battery and uses the internal battery as a 'back up' power supply in case this power is interrupted. In another embodiment, the appliance includes a single chipset that includes both the GPS module and the wireless transmitter.

In another aspect of the invention, the wireless appliance features a substrate (e.g., a printed circuit board) that supports the microprocessor, the vehicle-communication circuit, a GPS module and its antenna, and the wireless transmitter and its antenna.

In another aspect of the invention, the wireless appliance features a microprocessor that controls and processes data from both the vehicle-communication circuit and the GPS module. In this case, the GPS module receives GPS signals from an antenna and generates data in response. The GPS module then sends the data to the microprocessor to calculate location-based data. In this embodiment, both the GPS and radio antennae may be housed with the wireless appliance in a single enclosure. In other embodiments, a single chipset or ASIC includes both the GPS module and the wireless transmitter.

In another embodiment, the wireless appliance features a mechanical adaptor based on a connector that powers and provides a data link (e.g. a serial connection) to a plurality of wireless transmitters that each operate on different wireless networks. For example, the mechanical adaptor powers and provides a data link to wireless transmitters operating on terrestrial wireless networks such as CDMA, GSM, GPRS, AMPS, Mobitex, and DataTac, and satellite networks such as ORBCOMM. In this embodiment, the wireless appliance only hosts a single wireless transmitter at any time; this transmitter can then be replaced with a different device, operating on a different network, at a later time. The microprocessor is configured to determine the wireless network associated with the transmitter, and then direct a power-conditioning circuit to supply the correct power to the mechanical adaptor.

In another aspect, the invention provides a single ASIC that features (1) a microprocessor; (2) a vehicle-communication circuit containing multiple vehicle-communication modules; (3) a GPS module; and (4) a wireless transmitter. In embodiments, the ASIC additionally includes a multiplexing circuit configured to switch electrical communication from one vehicle-communication module to another.

In other embodiments of the present invention, a monitorable vehicle is provided. The vehicle may include, for example, an engine, transmission, braking mechanism, electrical system, on-board diagnostic system, and wireless appliance. The on-board diagnostic system is configured to query data relating to the vehicle, for example, related to the engine, transmission, braking mechanism, and/or electrical system. In some embodiments, the wireless appliance includes a substrate, a microprocessor supported by the substrate, a vehicle-communication circuit, a GPS module, and a wireless transmitter. The vehicle-communication circuit is in electrical communication with the microprocessor, includes modules that each manage a vehicle-communication protocol, and is interfaced with the on-board diagnostic system. The GPS module is in electrical communication with the microprocessor and includes a GPS antenna connected to the substrate. The wireless transmitter is configured to receive and transmit data generated by the GPS module and collected by the vehicle-communication circuit, and includes a radio antenna connected to the substrate.

The invention has many advantages. In particular, wireless, real-time transmission and analysis of GPS and diagnostic data, followed by analysis and display of these data using an Internet-hosted web site, makes it possible to characterize the vehicle's performance and determine its location in real-time from virtually any location that has Internet access, provided that the vehicle being tested includes the below-described wireless appliance. These data are complementary and, when analyzed together, can improve conventional services such as roadside assistance, vehicle theft notification and recovery, and remote diagnostics. For example, the data can indicate a vehicle's location, its fuel level and battery voltage, and whether or not it has any active DTCs. With these data a call center can dispatch a tow truck with the appropriate materials (e.g., extra gasoline or tools required to repair a specific problem) to repair the vehicle accordingly.

The primary electrical components of certain embodiments of the wireless appliance, i.e. circuitry for OBD-II communication, power management, battery, GPS, and wireless transmission, may be each integrated into a unique custom ASIC and housed on a single substrate. Likewise, the antennae for both the GPS and wireless transmitter may be integrated into the substrate. As such, the wireless appliance may take the form of a stand-alone unit that can be easily installed and hidden in the host vehicle. This reduces installation costs of the appliance and additionally makes it more difficult to disable when stealing a vehicle.

Moreover, integrating multiple conventional circuits into custom ASICs reduces manufacturing costs and increases reliability of the appliance. Specifically, the ASICs replace conventional discrete circuit components (e.g., resistors and capacitors) that are expensive and time-consuming to fabricate on a printed circuit board, and that tend to fail over time due to heat and vibration. This ultimately increases the cost effectiveness and reliability of the wireless appliance.

A wireless appliance according to embodiments of the present invention can also be easily transferred from one vehicle to another, or easily replaced if it malfunctions. No additional wiring is required to install the appliance; it is powered through the vehicle's OBD-II connector (assuming that such a connector is present in the vehicle) and using a back-up battery. The appliance can also be connected directly to a vehicle's electrical system, thus making it unnecessary to even use an OBD-II connector.

Embodiments of the present invention may be useful in a wide range of vehicles. Examples of such vehicles include automobiles and trucks, as well as commercial equipment, heavy trucks, power sport vehicles (e.g., motorboats, motorcycles, all-terrain vehicles, snowmobiles, jet skis, and other powered sport vehicles), collision repair vehicles, marine vehicles, and recreational vehicles. Further, embodiments may be useful in the vehicle care industry.

Although OBD-II diagnostic systems are disclosed herein for illustrative purposes, it is to be appreciated that embodiments of the present invention may be employed with other systems.

FIG. 1A is a schematic drawing of a small-scale wireless appliance 10 according to an embodiment of the present invention. The wireless appliance 10 includes a microprocessor 8, a vehicle-communication circuit 4, a GPS module 2, and a wireless transmitter 9. The wireless appliance 10 may be installed in a vehicle.

The GPS module 2 generates location-based data.

The vehicle-communication circuit 4 collects diagnostic data relating to the vehicle. In an embodiment, the vehicle-communication circuit 4 includes modules 6a, 6b, . . . , 6n for managing different vehicle-communication protocols, such as, for example, J1850 PWM, J1850 VPWM, ISO 9141-2, CAN, Keyword 2000, and J1708. As such, the vehicle-communication circuit 4 may collect data from any vehicle that utilizes a protocol among those supported by modules 6a, 6b, . . . , 6n. In an implementation, the vehicle-communication circuit is integrated into a single ASIC.

The microprocessor 8 is in electrical communication with the GPS module 2, the vehicle-communication circuit 4, and the wireless transmitter 9.

The wireless transmitter 9 receives and transmits location-based data generated by the GPS module 2 and diagnostic data collected by the vehicle-communication circuit 4.

Figure 1B:
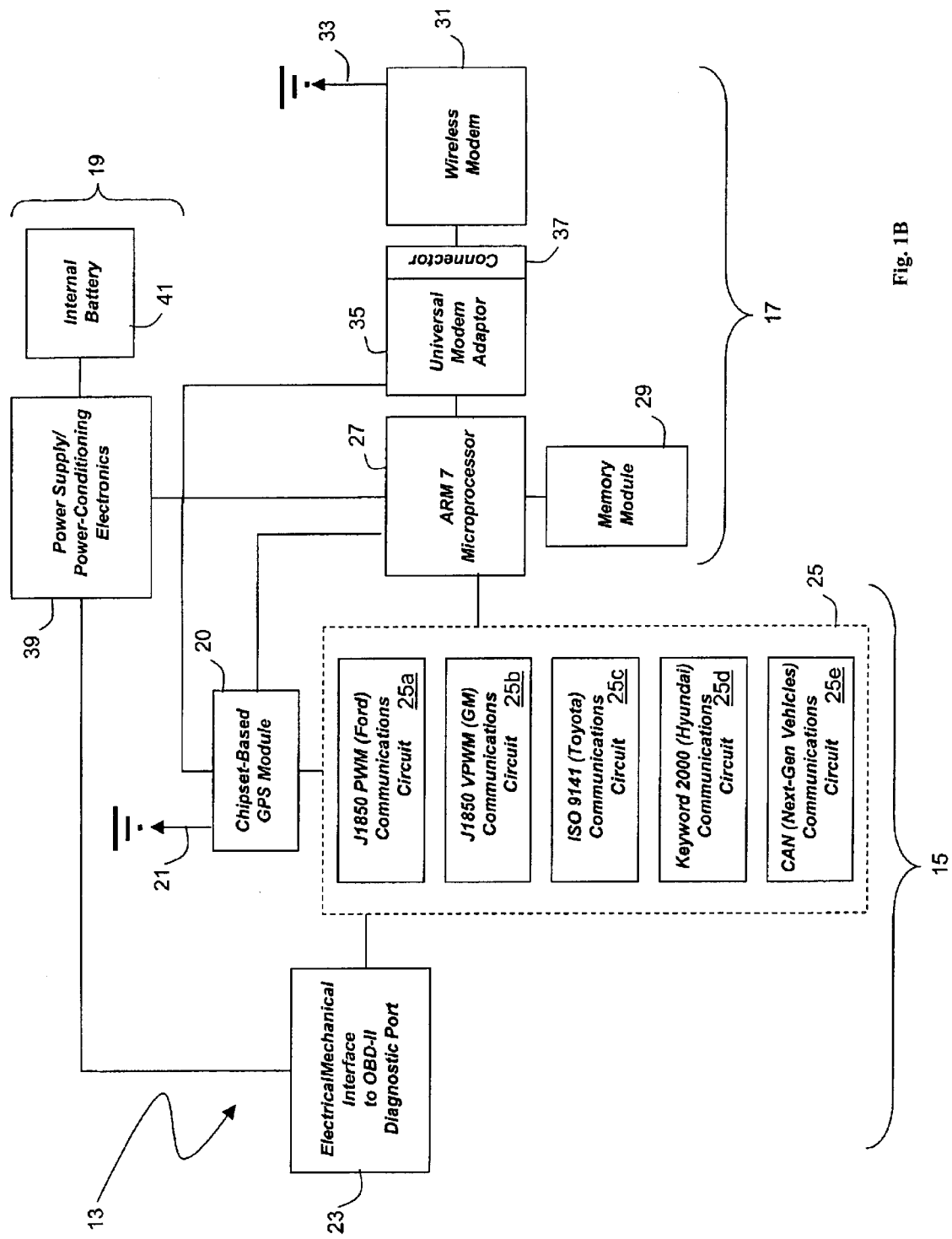
FIG. 1B is a schematic drawing of a wireless appliance according to an embodiment of the present invention featuring an integrated antennae and custom ASICs for power management, OBD-II communication, GPS, and a wireless transmitter.

FIG. 1B shows a small-scale wireless appliance 13 according to an embodiment of the present invention that monitors diagnostic and location-based data from a host vehicle and wirelessly transmits these data to an Internet-accessible website. The wireless appliance 13 features: (1) a data-generating portion 15 that generates both diagnostic and location-based data; (2) a data-processing portion 17 that processes and wirelessly transmits the diagnostic and location-based data; and (3) a power-management portion 19 that supplies power to each circuit element in the appliance. The circuit elements in each portion 15, 17, 19, described in more detail below, are each integrated into small-scale, silicon-based microelectronic devices (e.g., ASICs). This means that the entire wireless appliance 13 can be incorporated into a single 'chip set', described by a reference design, thereby reducing its size, manufacturing costs, and potential post-installation failures.

The data-generating portion 15 features a chipset-based GPS module 20 that receives wireless signals from orbiting GPS satellites through an integrated GPS antenna 21. To reduce cabling in the wireless appliance 13 and costs associated with its installation, the integrated GPS antenna 21 may attach to a metal ground plane within the appliance. Once the antenna 21 receives signals from at least three satellites, the GPS module 20 processes them to calculate a GPS 'fix' that includes the host vehicle's location-based data, e.g. latitude, longitude, altitude, heading, and velocity. The GPS module 20 calculates location-based data at a programmable interval, e.g. every minute.

Figure 5:
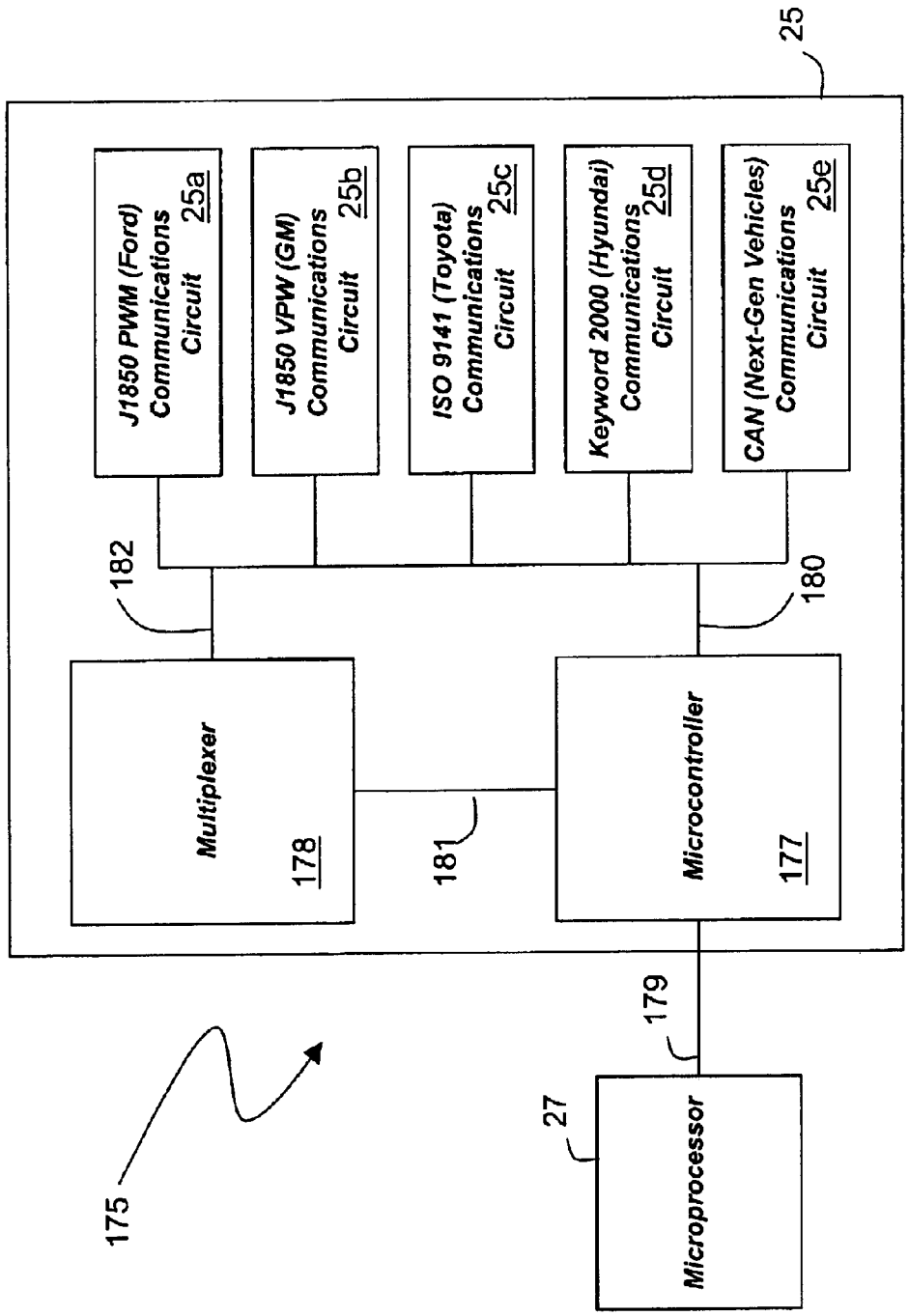
FIG. 5 is a schematic drawing of an ASIC used for the vehicle-communication circuit of FIG. 1B according to an embodiment of the present invention.
Figure 6:
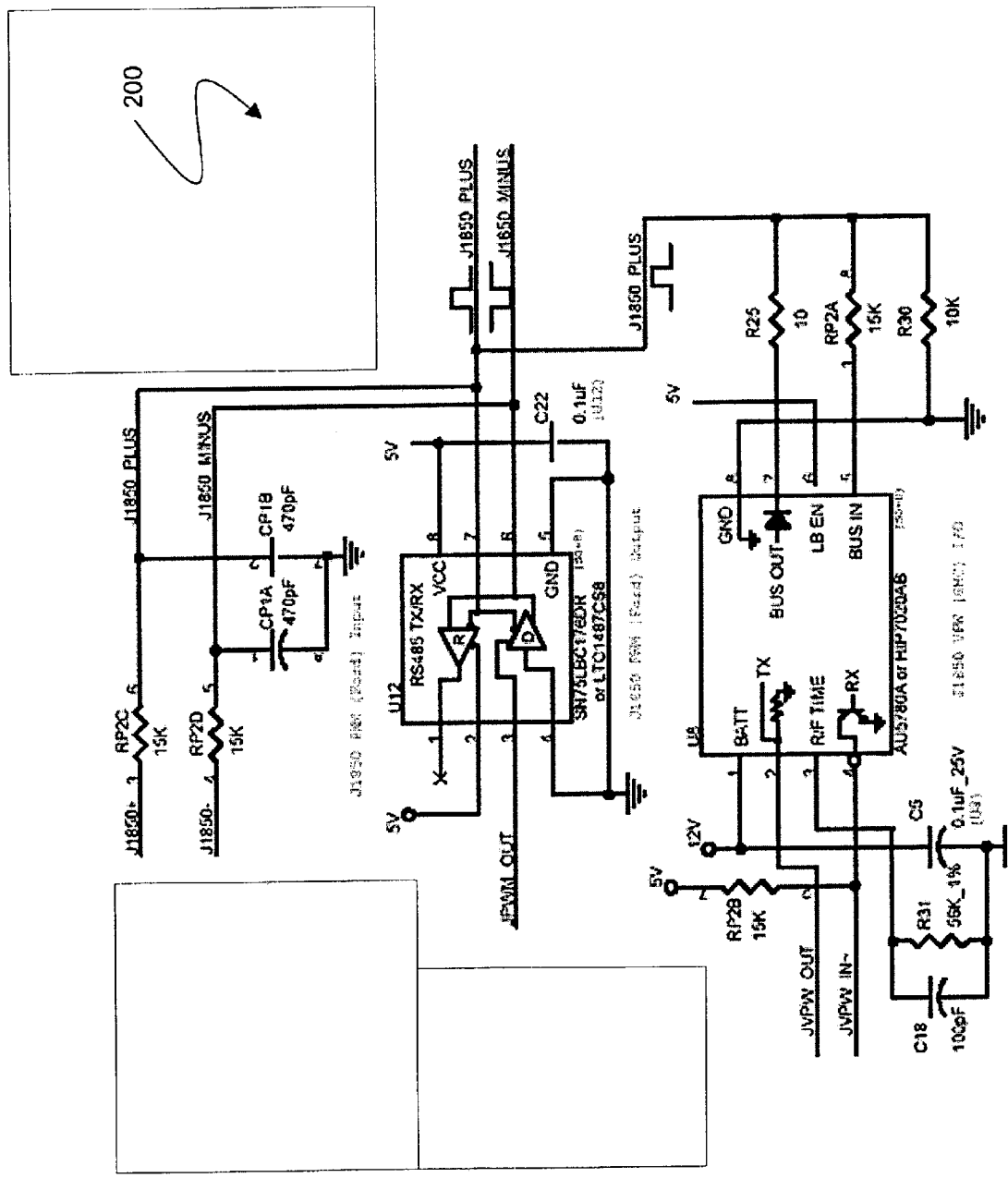
FIG. 6 is a logic diagram for the J1850 VPWM and J1850 PWM circuits used in the ASIC of FIG. 5 according to an embodiment of the present invention.
Figure 7:
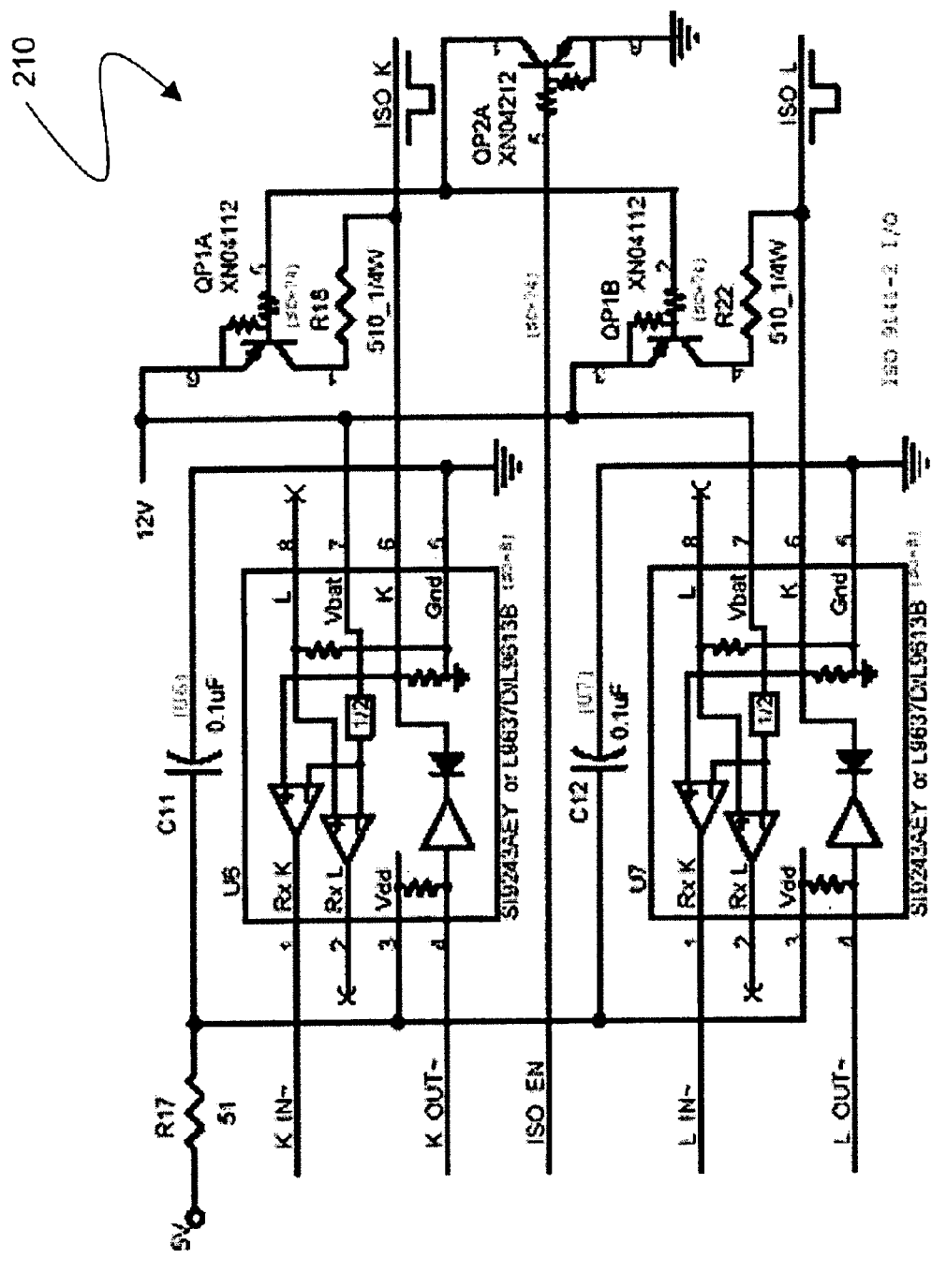
FIG. 7 is a logic diagram for the ISO 9141-2 circuit used in the ASIC of FIG. 5 according to an embodiment of the present invention.

The data-generating portion 15 communicates with the host vehicle through an electrical/mechanical interface 23 that connects to the vehicle's 16-cavity OBD-II diagnostic connector. The diagnostic connector, typically located underneath the vehicle's steering column, provides direct access to diagnostic data stored in memory in the vehicle's ECU. The entire vehicle-communication circuit 25 is integrated into a single ASIC and manages communication through the electrical/mechanical interface 23 with separate modules 25a–25e for different vehicle buses (e.g., those featured in Ford, GM, Toyota). Each module 25a–25e is a separate integrated circuit within the vehicle-communication circuit 25. FIGS. 5–7, described in detail below, show detailed schematic drawings of embodiments of both the vehicle-communication circuit and some of the modules included therein. The modules feature circuit elements that communicate according to vehicle-specific protocols, described below with reference to Tables 1 and 2.

The vehicle-communication circuit additionally includes logic that detects the communication protocol of the host vehicle, and then selects this protocol to communicate with the vehicle. Once the protocol is selected, the electrical/mechanical interface 23 receives diagnostic data from the vehicle and passes it through the vehicle-communication circuit 25 to the data-processing portion 17 for analysis.

It is to be appreciated that the specific protocols supported by the vehicle-communication circuit 25 of FIG. 1B are merely examples. In some embodiments, more, fewer, or other protocols may be supported by a vehicle-communication circuit.

The data-processing portion 17 features a 16-bit ARM7 microprocessor 27 that receives and processes diagnostic data from the data-communication circuit 25 and location-based data from the GPS module 20. For example, the microprocessor 27 can process diagnostic data describing the host vehicle's speed, mass air flow, and malfunction indicator light to calculate, respectively, an odometer reading, fuel efficiency, and emission status.

The microprocessor 27 additionally stores firmware and pre and/or post-processed diagnostic data in a memory module 29. The memory module 29 additionally stores an operating system (e.g., Linux) that runs on the microprocessor 27. During operation, the memory module can additionally function as a 'data logger' where both diagnostic and location-based data are captured at high rates (e.g., every 200 milliseconds) and then read out at a later time.

With firmware the microprocessor 27 formats the diagnostic and location-based data into separate packets and serially transfers these packets through a universal modem adaptor 35 to a wireless modem 31. Each formatted packet includes, e.g., a header that describes its destination and includes the wireless modem's numerical identity (e.g., its 'phone number') and a payload that includes the data. The wireless modem 31 operates on a wireless network (e.g., CDMA, GSM, GPRS, Mobitex, ORBCOMM) and transmits the packets through an antenna 33 to the network. The antenna 33 is typically embedded into a circuit board or mechanical housing that supports the wireless modem 31. Once transmitted, the packets propagate through the network, which delivers them to an Internet-accessible website, for example, as described in more detail with reference to FIG. 2.

The universal modem adaptor 35 provides power, mechanical support, and a serial interface to the wireless modem 31 through a multi-pin mechanical connector 37. The connector's pin configuration powers and supports a variety of different modems that, in turn, can operate on different wireless networks. One modem (e.g. a Mobitex modem) can be easily replaced with another (e.g., a satellite modem) that has better wireless coverage within a particular region. The firmware running on the microprocessor 27 is configured to recognize the wireless modem 31 attached to the universal modem adaptor 35 (using, e.g., the modem's electronic serial number) and format outgoing packets accordingly. In this way the wireless appliance can be easily configured to operate on different wireless networks throughout the world.

The power-management portion 19 of the wireless appliance 13 features a power supply and power-conditioning electronics 39 that receive 12 volts DC power from the electrical/mechanical interface 23 and, in turn, supply regulated DC power to circuit elements in the data-generating 15 and data-processing 17 portions. Typically the 12 volts from the vehicle's battery is switched to a lower voltage, e.g., 3.3–5 volts, to power the circuit elements. The mechanical interface 23, in turn, attaches to the host vehicle's diagnostic connector, which receives power directly from the vehicle's standard 12-volt battery. An internal battery 41 connects to the power supply and power-conditioning electronics 39 and supplies power in case the wireless appliance is disconnected from the vehicle's power-supplying diagnostic connector. Additionally, the power supply and power-conditioning electronics 39 continually recharge the internal battery 41 so that it can supply back-up power even after extended use.

Figure 2:
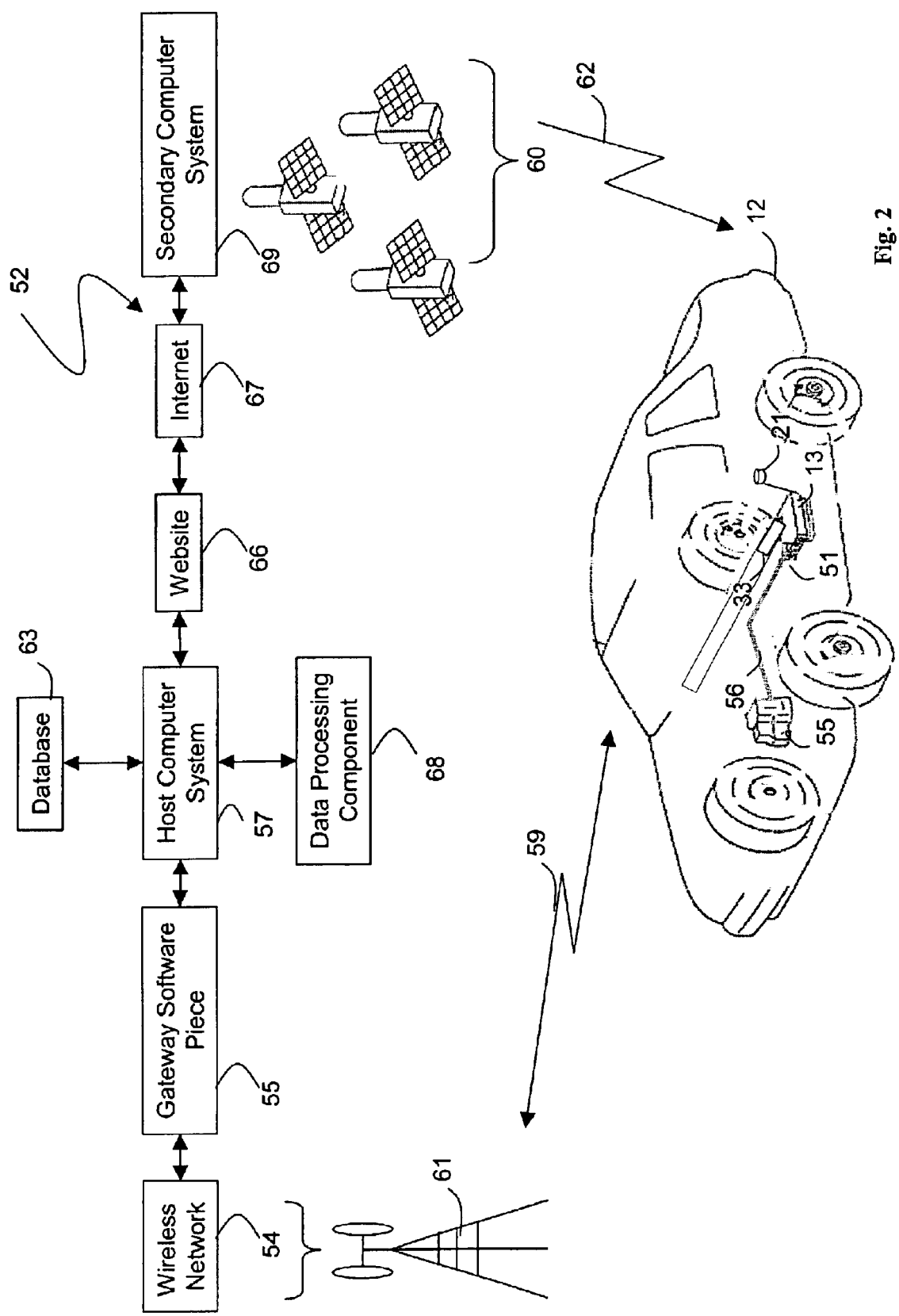
FIG. 2 is a schematic drawing of a vehicle featuring a wireless appliance that communicates with a GPS, a wireless communication network, and an Internet-accessible web page according to an embodiment of the present invention.

FIG. 2 shows a schematic drawing of an Internet-based system 52 that uses the above-described wireless appliance 13, or related embodiments thereof, to monitor both diagnostic and location-based data from a host vehicle 12. The wireless appliance 13 connects to the vehicle's OBD-II diagnostic connector 51 and collects diagnostic data by querying the vehicle's ECU 55 through a cable 56. In response to a query, the ECU 55 retrieves data stored in its memory and sends it along the same cable 56 to the wireless appliance 13. The GPS module in the wireless appliance 13 measures the vehicle's location-based data using an antenna 21 that is typically integrated into the wireless appliance or hidden within the vehicle (e.g., under the vehicle's dashboard). To calculate the vehicle's location, the antenna 21 collects signals 62 from an overlying constellation of GPS satellites 60 and sends these signals to the GPS module for processing.

During operation, the wireless appliance 13 formats the diagnostic and GPS data in separate data packets and transmits these packets through an embedded radio antenna 33 over an airlink 59 to a base station 61 included in a wireless network 54. As described above, the embedded antenna 33 is typically included in a mechanical housing or circuit board used in the wireless appliance. The data packets propagate through the wireless network 54 to a gateway software piece 55 running on a host computer system 57. Using the gateway software piece 55, the host computer system processes and stores data from the data packets in a database 63. The host computer system 57 additionally may host a web site 66 that, once accessed, displays the data. A user (e.g. an individual working for a call center) accesses the web site 66 with a secondary computer system 69 through the Internet 67.

FIG. 3 shows a sample web page 130 included in the website of FIG. 2, for example, that displays diagnostic data collected from the ECU of a particular vehicle as described above. The web page 130 includes a set of diagnostic data 131 and features fields listing, for example, an acronym 132, value and units 134, and brief description 136 for each datum. During typical operation, the wireless appliance automatically transmits sets of diagnostic data 131 like the one shown in FIG. 3 at periodic intervals, e.g. every 20 to 40 minutes. The wireless appliance can also transmit similar data sets at random time intervals in response to a query from the host computer system (sometimes called a 'ping').

Figure 4A:
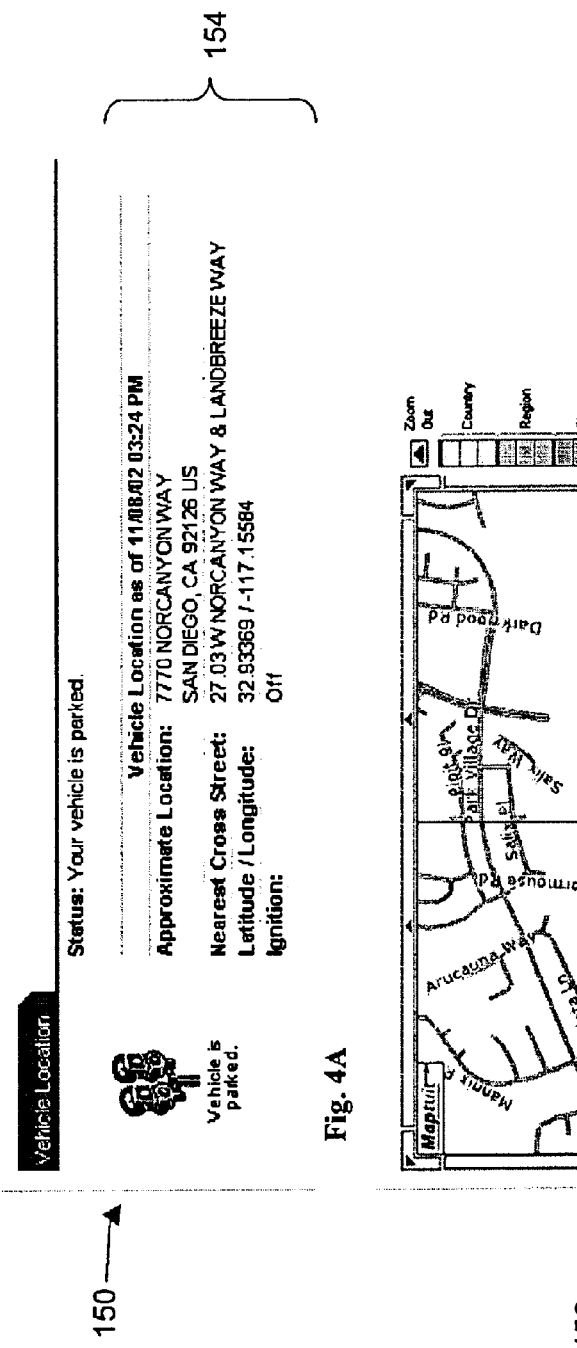
FIGS. 4A and 4B are web pages displaying, respectively, screen captures of a vehicle's numerical latitude and longitude and a map showing the vehicle's location monitored by the wireless appliance of FIG. 1B according to an embodiment of the present invention.
Figure 4B:
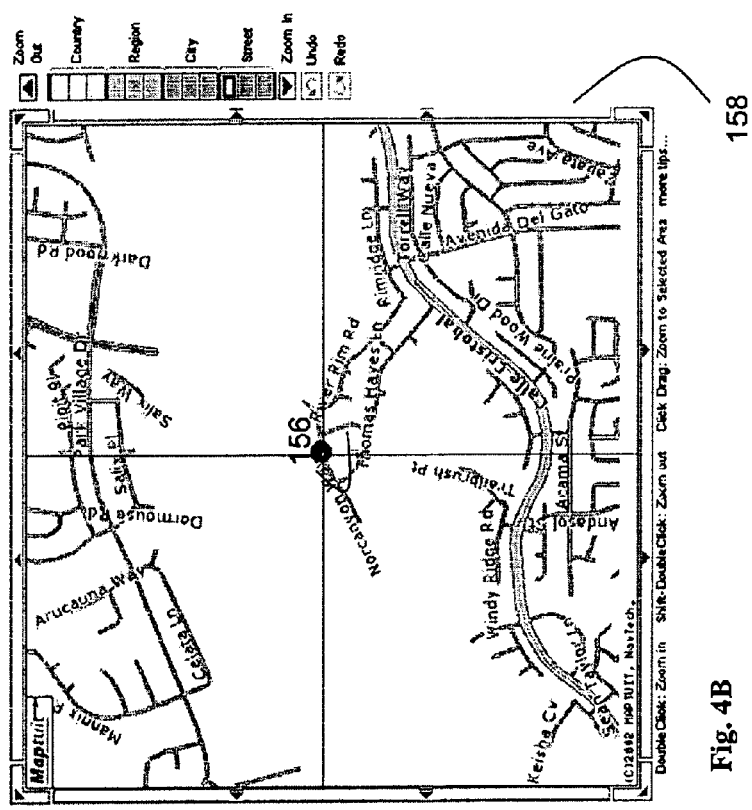

FIGS. 4A and 4B show sample web pages 150, 152 included in the website of FIG. 2, for example, that display, respectively, GPS data 154 and a map 158 that together indicate a vehicle's location 156. In this case, the GPS data 154 include the vehicle's latitude, longitude, a 'reverse geocode' of these data indicating a corresponding street address, the nearest cross street, and a status of the vehicle's ignition (i.e., 'on' or 'off' and whether or not the vehicle is parked or moving). The map 158 displays these coordinates in a graphical form relative to an area of, in this case, a few square miles. In typical embodiments, the web pages 150, 152 are rendered each time the GPS data are periodically transmitted from a vehicle (e.g., every 1–2 minutes) and received by the data-processing component of the website. Both the map and a database that translates the latitude and longitude into a reverse geocode are accessible though an Internet-based protocol, e.g. XML, Web Services, or TCP/IP. Companies such as MapTuit, MapQuest, and NavTech support software that provides such maps and databases.

As described above, the vehicle-communication circuit 25 in FIG. 1B is a custom ASIC that features individual modules for managing communication protocols for different vehicles. Table 1, below, summarizes protocols for J1850 PWM/VPWM and ISO 9141-2, their baud rate and pulse width specifications, and a representative sample of vehicles that support the protocol.

TABLE 1

Communication Protocols for Vehicles

| Protocol | Vehicle | Baud Rate (kbits/s) | Pulse Width |
|---|---|---|---|
| J1850 PWM | Ford | 41.6 | constant |
| J1850 VPWM | GM, Chrysler | 10.4 | variable |
| ISO 9141-2 | Toyota, Chrysler | 10.4 | constant |

These protocols are also described in detail in the following publications listed in Table 2.

TABLE 2

References Describing Vehicle-Communication Protocols

| | |
|---|---|
| Protocol | J1850 PWM and J1850 VPWM |
| Reference | 'Implementing the J1850 Protocol' |
| Source | ftp://download.intel.com/design/intarch/papers/j1850 wp.pdf |
| Protocol | ISO 9141-2 |
| Reference | 'Automotive ISO 9141 Serial Link Driver' |
| Source | http://roadrunneresng.dibe.unige.it/EESS.Kit/Software%20e%20documentazione/Data%20sheets%20componenti%20elettronici/IC%20Analogici/mc33199rev0f.pdf |

FIG. 5 shows a schematic diagram of an ASIC 175 and microprocessor 27 according to an embodiment of the present invention. ASIC 175 is used for the vehicle communication circuit 25 that connects to the host vehicle through a mechanical/electrical interface to the vehicle's OBD-11 diagnostic port. The ASIC 175 features separate modules 25*a–e* that individually support communication protocols for J1850 VPWM, J1850 PWM, ISO-9141, CAN (e.g., ISO-15765), Keyword 2000, and J1708, for example. The ASIC 175 includes an internal microcontroller 177 that connects to an external microprocessor (e.g., the ARM7 microprocessor 27 in FIG. 1B) through a data link 179, e.g. an asynchronous serial channel. The microcontroller 177 additionally connects to and receives data from each vehicle-communication module 25*a–e* through a first set of general-purpose input/output (GPIO) pins 180. A second set 181 of GPIO pins in the microcontroller control a multiplexer 178. The multiplexer 178 contains a third set of pins 182 that switch between the five vehicle-communication modules 25*a–e*.

During operation, the microprocessor 27 determines the communication protocol of the host vehicle, such as by monitoring the baud rate and pulse width characteristics of the host vehicle's communication protocol through the mechanical/electrical interface. In another embodiment, the microprocessor determines the communication protocol of the host vehicle by testing each protocol in an effort to establish communication. The microprocessor then selects the protocol that successfully communicated with the vehicle. In still another embodiment, the microprocessor is configured to test outputs of a diagnostic system in the host vehicle. For example, the microprocessor may test whether respective output pins of a diagnostic connector are active. Certain communication protocols use a predetermined subset of output pins for communication. Therefore, the presence of electrical signals on a particular subset of output pins may indicate that the host vehicle is utilizing the vehicle-communication protocol associated with that particular subset.

After the host vehicle's vehicle-communication protocol is determined, the microprocessor 27 then communicates the protocol to the microcontroller 177 over the data link 179. Using two pins in the third set of pins 182, the multiplexer 178 selects one of the five modules 25a–e to communicate with the host vehicle. A third pin in the third set of pins 182 either enables a module by providing power, or disables a module by removing power. In this way, the multiplexer 178 effectively selects the module that is used to communicate with the host vehicle.

FIGS. 6 and 7 show, respectively, logic diagrams 200, 210 used for vehicle-communication modules supporting the J1850 PWM/VPWM and ISO 9141-2 protocols described above according to embodiments of the present invention. As indicated above in FIG. 5, these logic diagrams represent circuits that function as individual modules within the data-communication circuit and are integrated directly into the ASIC.

Other embodiments are also within the scope of the invention. In particular, logic diagrams and corresponding circuits other than those described above can be used to implement protocols such as J1850 PWM/VPWM, ISO 9141-2, CAN, Keyword 2000, and J1708. These protocols can be implemented using integrated silicon-based solutions (e.g., a custom ASIC), or using transistors or conventional circuit elements. Similarly, hardware architectures other than that described above can be used for a wireless appliance such as wireless appliance 13. For example, the ARM7 microprocessor used to run the appliance's firmware may be contained within the GPS module or the wireless modem. Or a different microprocessor may be used. And the antennae for both the modem and the GPS module can be implemented using different configurations. In one embodiment, for example, either or both antennae may be implemented as discrete circuits directly onto the circuit board. Similarly, active antennae, which are conventionally used for GPS, may also be used for the radio antenna connected to the wireless modem. In another embodiment, the internal battery may be a solar cell.

In yet another embodiment, a wiring harness may be used to attach the wireless appliance to the vehicle's OBD-II diagnostic connector. This allows the wireless appliance to be hidden in the vehicle, thereby making the device effective for recovery of stolen vehicles.

The packets described above may be transmitted at pre-set time intervals (e.g., once every 20 minutes for diagnostic data; once every minute for GPS data). Alternatively or additionally, the transmission may be performed when authorized by a user of the system (e.g., using a button on the website). In still other embodiments, the transmission is performed when a data parameter (e.g. engine coolant temperature) exceeds a predetermined value. Or a third party, such as the call center, may prompt transmission and/or analysis of data.

In other embodiments, a radio modem used to transmit GPS data may employ a terrestrial GPS system, such as a 'network-assisted' GPS available on chipsets designed by Qualcomm, Inc. In this case GPS data is determined by processing data from both satellites and terrestrial base stations. In addition, the wireless appliance may be interfaced to other sensors deployed in the vehicle to monitor additional data. For example, sensors for measuring tire pressure and temperature may be deployed in the vehicle and interfaced to the appliance so that data relating the tires' performance can be transmitted to the host computer system. These data can then be further analyzed along with the diagnostic and GPS data. Accelerometers can also be used as sensors to detect collisions.

In still other embodiments, other location-based applications can be combined with the above-mentioned mapping capabilities to provide real-time internet-based services involving maps. For example, data indicating traffic can be combined with mapping software to generate internet-based, real-time 'traffic maps' that graphically indicate traffic patterns. In this case data such as vehicle speed can be generated and transmitted by the in-vehicle wireless appliance described above. These data can also be used, for example, to generate an optimum travel route that minimizes traffic delays. Similarly, algorithms used to calculate vehicle emissions can be combined with the mapping software to generate real-time 'emissions maps' that graphically indicate pollutants such as oxides of nitrogen, carbon monoxide, or hydrocarbon emissions.

The foregoing description of the various embodiments of the present invention is provided to enable any person skilled in the art to make and use the present invention and its embodiments. Various modifications to these embodiments are possible, and the generic principles presented herein may be applied to other embodiments as well.

For instance, in still other embodiments, the above-described system is used to locate vehicles or things other than cars and trucks, such as industrial equipment or shipping containers.

Further, some embodiments of the present invention may be implemented in part or in whole as a hard-wired circuit, as a circuit configuration fabricated into an application-specific integrated circuit, or as a firmware program loaded into non-volatile storage, or a software program loaded from or into a data storage medium as machine-readable code. Such machine-readable code may include instructions executable by an array of logic elements, such as a microprocessor or other digital signal processing unit.

It will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with some of the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

It can be appreciated, for example, that some process aspects described herein may be performed, in certain embodiments, using instructions stored on a computer-readable medium or media that direct a computer system to perform the process aspects. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device, which devices may be capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize that these and other elements may be desirable. However, because such elements are well known in the art, and because they do not facilitate a better understanding of the present invention, a discussion of such elements is not provided herein.

In some embodiments of the present invention disclosed herein, a single component can be replaced by multiple components, and multiple components replaced by a single component, to perform a given function or functions. Except where such substitution would not be operative to practice embodiments of the present invention, such substitution is within the scope of the present invention.

What is claimed is:

1. A wireless appliance for monitoring a vehicle, comprising:
   (a) a microprocessor configured to determine a vehicle-communication protocol of a host vehicle;
   (b) a vehicle-communication circuit in electrical communication with the microprocessor and integrated into a single ASIC comprising modules that each manage a vehicle-communication protocol, wherein a module in the vehicle-communication circuit comprises a circuit configured to support at least one of the J1850 PWM, J1850 VPWM, ISO 9141-2, CAN, Keyword 2000, and J1708 vehicle-communication protocols, and wherein the vehicle-communication circuit is configured to be interfaced with a diagnostic connector in the host vehicle;
   (c) a multiplexing circuit configured to provide electrical communication between the microprocessor and a module of the vehicle-communication circuit, wherein the multiplexing circuit is configured to switch electrical communication from one module to another;
   (d) a GPS module in electrical communication with the microprocessor;
   (e) a wireless transmitter configured to transmit data generated by the GPS module and collected by the vehicle-communication circuit;
   (f) a GPS antenna in electrical contact with the GPS module;
   (g) a radio antenna in electrical contact with the wireless transmitter; and
   (h) a single housing that houses the GPS antenna, the radio antenna, the microprocessor, the vehicle-communication circuit, the GPS module, and the wireless transmitter,
   wherein the microprocessor is further configured to select a module in the vehicle-communication circuit that supports the determined vehicle-communication protocol.

2. A wireless appliance for monitoring a vehicle, comprising:
   (a) a microprocessor;
   (b) a vehicle-communication circuit in electrical communication with the microprocessor and integrated into a single ASIC comprising modules that each manage a vehicle-communication protocol; and
   (c) a wireless transmitter configured to transmit data collected by the vehicle-communication circuit.

3. The wireless appliance of claim 2, further comprising:
   (a) a GPS module in electrical communication with the microprocessor,
   wherein the wireless transmitter is further configured to transmit data generated by the GPS module.

4. The wireless appliance of claim 3, further comprising:
   (a) a GPS antenna in electrical contact with the GPS module;
   (b) a radio antenna in electrical contact with the wireless transmitter; and
   (c) a single housing that houses the GPS antenna, the radio antenna, the microprocessor, the vehicle-communication circuit, the GPS module, and the wireless transmitter.

5. The wireless appliance of claim 3, further comprising a single chipset that comprises the GPS module and the wireless transmitter.

6. The wireless appliance of claim 2, wherein a module in the vehicle-communication circuit comprises a circuit configured to support at least one of the following vehicle-communication protocols: J1850 PWM, J1850 VPWM, ISO 9141-2, CAN, Keyword 2000, and J1708.

7. The wireless appliance of claim 6, wherein the vehicle-communication circuit comprises separate modules each configured to support one of the following vehicle-communication protocols: J1850 PWM, J1850 VPWM, ISO 9141-2, CAN, Keyword 2000, and J1708.

8. The wireless appliance of claim 7, further comprising a multiplexing circuit configured to provide electrical communication between the microprocessor and a module of the vehicle-communication circuit.

9. The wireless appliance of claim 8, wherein the multiplexing circuit is configured to switch electrical communication from one module to another.

10. The wireless appliance of claim 2, wherein the vehicle-communication circuit further comprises a microcontroller.

11. The wireless appliance of claim 10, wherein the microcontroller is configured to connect to the microprocessor using an asynchronous serial connection.

12. The wireless appliance of claim 2, wherein the microprocessor is configured to determine a vehicle-communication protocol of a host vehicle.

13. The wireless appliance of claim 12, wherein the host vehicle is selected from a group comprising an automobile, truck, wheeled commercial equipment, heavy truck, power sport vehicle, collision repair vehicle, marine vehicle, and recreational vehicle.

14. The wireless appliance of claim 12, wherein the microprocessor is configured to monitor at least one of a baud rate and at least one pulse width characteristic of the vehicle-communication protocol of the host vehicle.

15. The wireless appliance of claim 12, wherein the microprocessor is configured to initiate, using a first vehicle-communication protocol, at least one test communication with the host vehicle.

16. The wireless appliance of claim 12, wherein the microprocessor is configured to test a plurality of outputs of a diagnostic system in the host vehicle.

17. The wireless appliance of claim 16, wherein the plurality of outputs are tested to determine whether respective outputs are active.

18. The wireless appliance of claim 12, wherein the microprocessor is further configured to select a module in the vehicle-communication circuit that supports the determined vehicle-communication protocol.

19. The wireless appliance of claim 2, wherein the wireless appliance is configured to query an engine control unit (ECU) of the vehicle.

20. The wireless appliance of claim 2, further comprising an internal battery.

21. The wireless appliance of claim 20, wherein the internal battery comprises a solar cell.

22. The wireless appliance of claim 20, further comprising a power-conditioning circuit in electrical communication with the internal battery and a power source of the vehicle.

23. The wireless appliance of claim 2, wherein the microprocessor is configured to interface with a memory module.

24. The wireless appliance of claim 2, wherein the wireless transmitter comprises a wireless modem.

25. The wireless appliance of claim 24, wherein the microprocessor is configured to identify the wireless modem.

26. The wireless appliance of claim 25, wherein the microprocessor is configured to identify the wireless modem based at least in part on an electronic serial number of the wireless modem.

27. The wireless appliance of claim 24, wherein the wireless modem utilizes an active antenna.

28. The wireless appliance of claim 2, wherein the vehicle-communication circuit is configured to be interfaced with a diagnostic connector in the vehicle.

29. The wireless appliance of claim 28, wherein the wireless appliance is configured to receive power, at least in part, via the diagnostic connector.

30. The wireless appliance of claim 28, wherein the diagnostic connector is an OBD-II connector.

31. The wireless appliance of claim 28, wherein the wireless appliance is configured to be attached to the diagnostic connector via a wiring harness.

32. The wireless appliance of claim 2, wherein the wireless appliance is interfaced with at least one sensor in the vehicle.

33. The wireless appliance of claim 32, wherein the at least one sensor comprises a tire pressure or temperature sensor.

34. The wireless appliance of claim 2, wherein the wireless appliance is directly interfaced with an electrical system of the vehicle.

35. A wireless appliance for monitoring a vehicle, comprising:
 (a) a substrate;
 (b) a microprocessor supported by the substrate;
 (c) a vehicle-communication circuit, in electrical communication with the microprocessor, comprising modules that each manage a different vehicle-communication protocol; and
 (d) a wireless transmitter, configured to transmit data collected by the vehicle-communication circuit, including a radio antenna connected to the substrate.

36. The wireless appliance of claim 35, further comprising:
 (a) a GPS module, in electrical communication with the microprocessor, including a GPS antenna connected to the substrate,
 wherein the wireless transmitter is further configured to transmit data generated by the GPS module.

37. The wireless appliance of claim 36, further comprising a single chipset that comprises both the GPS module and the wireless transmitter.

38. The wireless appliance of claim 35, wherein a module in the vehicle-communication circuit comprises a circuit configured to support at least one of the following vehicle-communication protocols: J1850 PWM, J1850 VPWM, ISO 9141-2, CAN, Keyword 2000, and J1708.

39. The wireless appliance of claim 38, wherein the vehicle-communication circuit comprises separate modules configured to support one of the following vehicle-communication protocols: J1850 PWM, J1850 VPWM, ISO 9141-2, CAN, Keyword 2000, and J1708.

40. The wireless appliance of claim 39, further comprising a multiplexing circuit configured to provide electrical communication between the microprocessor and a module of the vehicle-communication circuit.

41. The wireless appliance of claim 40, wherein the multiplexing circuit is configured to switch electrical communication from one module to another.

42. The wireless appliance of claim 35, wherein the vehicle-communication circuit further comprises a microcontroller.

43. The wireless appliance of claim 42, wherein the microcontroller connects to the microprocessor using an asynchronous serial connection.

44. The wireless appliance of claim 35, wherein the microprocessor is configured to determine a vehicle-communication protocol of a host vehicle.

45. The wireless appliance of claim 44, wherein the microprocessor is further configured to select a module in the vehicle-communication circuit that is configured to support the determined vehicle-communication protocol.

46. The wireless appliance of claim 35, further comprising an internal battery.

47. The wireless appliance of claim 46, further comprising a power-conditioning circuit in electrical communication with the internal battery and a power source of the host vehicle.

48. The wireless appliance of claim 35, wherein the vehicle is selected from a group comprising an automobile, truck, wheeled commercial equipment, heavy truck, power sport vehicle, collision repair vehicle, marine vehicle, and recreational vehicle.

49. A wireless appliance for monitoring a vehicle, comprising:
  (a) a microprocessor;
  (b) a vehicle-communication circuit, in electrical communication with the microprocessor, comprising one or more modules that each manage a different vehicle-communication protocol to collect diagnostic data from a host vehicle; and
  (c) a wireless transmitter controlled by the microprocessor and configured to transmit the diagnostic data.

50. The wireless appliance of claim 49, further comprising:
  (a) a GPS module, in electrical communication with the microprocessor, configured to receive GPS signals from an antenna, generate data in response to the signals, and then send the data to the microprocessor to calculate location-based data,
  wherein the wireless transmitter is further configured to transmit the location-based data.

51. The wireless appliance of claim 50, further comprising:
  (a) a GPS antenna in electrical contact with the GPS module;
  (b) a radio antenna in electrical contact with the wireless transmitter; and
  (c) a single housing that houses the GPS antenna, the radio antenna, the microprocessor, the vehicle-communication circuit, the GPS module, and the wireless transmitter.

52. The wireless appliance of claim 50, further comprising a single chipset that comprises the GPS module and the wireless transmitter.

53. The wireless appliance of claim 49, wherein the host vehicle is selected from a group comprising an automobile, truck, wheeled commercial equipment, heavy truck, power sport vehicle, collision repair vehicle, marine vehicle, and recreational vehicle.

54. A wireless appliance for monitoring a vehicle, comprising:
  (a) a microprocessor; and
  (b) a mechanical adaptor interfaced with the microprocessor and comprising a connector configured to power and provide a data link to a plurality of wireless transmitters configured to operate on different wireless networks.

55. The wireless appliance of claim 54, further comprising:
  (a) A GPS module in electrical communication with the microprocessor; and
  (b) a single wireless transmitter connected to the mechanical adaptor and configured to transmit data generated by the GPS module.

56. The wireless appliance of claim 54, wherein the mechanical adaptor is configured to power and provide a data link to wireless transmitters configured to operate on at least one of the following wireless networks: CDMA, GSM, GPRS, AMPS, Mobitex, DataTac, and ORBCOMM.

57. The wireless appliance of claim 54, wherein the microprocessor is configured to determine a wireless network associated with the wireless transmitter.

58. The wireless appliance of claim 54, wherein the data link is an electrical line for serial data communication.

59. The wireless appliance of claim 54, further comprising a power-conditioning circuit in electrical contact with the mechanical adaptor.

60. The wireless appliance of claim 59, wherein the microprocessor is configured to determine at least one power requirement of the wireless transmitter.

61. The wireless appliance of claim 60, wherein the microprocessor is in electrical communication with the power-conditioning circuit and is configured to control power supplied to the wireless transmitter.

62. The wireless appliance of claim 54, wherein the vehicle is selected from a group comprising an automobile, truck, wheeled commercial equipment, heavy truck, power sport vehicle, collision repair vehicle, marine vehicle, and recreational vehicle.

63. A single ASIC, comprising:
  (a) a microprocessor;
  (b) a vehicle-communication circuit in electrical communication with the microprocessor and comprising modules that each manage a vehicle-communication protocol; and
  (c) a wireless transmitter configured to transmit data collected by the vehicle-communication circuit.

64. The ASIC of claim 63, further comprising:
  (a) a GPS module in electrical communication with the microprocessor,
  wherein the wireless transmitter is further configured to transmit data generated by the GPS module.

65. The ASIC of claim 63, wherein a module in the vehicle-communication circuit comprises a circuit configured to support at least one of the following vehicle-communication protocols: J1850 PWM, J1850 VPWM, ISO 9141-2, CAN, Keyword 2000, and J1708.

66. The ASIC of claim 65, wherein the vehicle-communication circuit comprises separate modules configured to support one of the following vehicle-communication protocols: J1850 PWM, J1850 VPWM, ISO 9141-2, CAN, Keyword 2000, and J1708.

67. The ASIC of claim 66, further comprising a multiplexing circuit configured to provide electrical communication between the microprocessor and a module of the vehicle-communication circuit.

68. The ASIC of claim 67, wherein the multiplexing circuit is configured to switch electrical communication from one module to another.

69. The ASIC of claim 68, wherein the vehicle-communication circuit further comprises a microcontroller.

70. The ASIC of claim 69, wherein the microcontroller connects to the microprocessor using an asynchronous serial connection.

71. The ASIC of claim 63, wherein the microprocessor is configured to determine a vehicle-communication protocol of a host vehicle.

72. The ASIC of claim 71, wherein the microprocessor is further configured to select a module in the vehicle-communication circuit that is configured to support the determined vehicle-communication protocol.

73. The ASIC of claim 71, wherein the host vehicle is selected from a group comprising an automobile, truck, wheeled commercial equipment, heavy truck, power sport vehicle, collision repair vehicle, marine vehicle, and recreational vehicle.

74. A monitorable vehicle, comprising:
  (a) a vehicle including an on-board diagnostic system configured to query data relating to the vehicle; and
  (b) a wireless appliance, comprising,
    (i) a substrate;
    (ii) a microprocessor supported by the substrate;
    (iii) a vehicle-communication circuit, in electrical communication with the microprocessor, comprising modules that each manage a different vehicle-communication protocol, wherein the vehicle-communication circuit is interfaced with the on-board diagnostic system; and
    (iv) a wireless transmitter, configured to transmit data collected by the vehicle-communication circuit, including a radio antenna connected to the substrate.

75. The monitorable vehicle of claim 74, wherein the vehicle is selected from a group comprising an automobile, truck, wheeled commercial equipment, heavy truck, power sport vehicle, collision repair vehicle, marine vehicle, and recreational vehicle.

76. The monitorable vehicle of claim 74, wherein the vehicle-communication circuit is interfaced with the on-board diagnostic system via a diagnostic connector.

77. The monitorable vehicle of claim 76, wherein the wireless appliance is attached to the diagnostic connector via a wiring harness.

78. The monitorable vehicle of claim 74, wherein the vehicle-communication circuit is directly interfaced with the electrical system.

79. The monitorable vehicle of claim 74, wherein the wireless appliance further comprises:
  (i) a GPS module, in electrical communication with the microprocessor, including a GPS antenna connected to the substrate,
  wherein the wireless transmitter is further configured to transmit data generated by the GPS module.

* * * * *